(12) United States Patent
Macatangay et al.

(10) Patent No.: US 10,313,192 B2
(45) Date of Patent: Jun. 4, 2019

(54) AUTOMATED CREATION OF TEST TENANTS FOR DATA CENTER TECHNICAL ISSUE DETECTION

(71) Applicant: Microsoft Technology Licensing, LLC, Redmond, WA (US)

(72) Inventors: Darell D. Macatangay, Redmond, WA (US); Zhongqin Wu, Sammamish, WA (US); Kok Keong Soh, Bothell, WA (US); Francisco Javier Gutierrez Gutierrez, Bellevue, WA (US); Diane K. Rapp, Snohomish, WA (US); Victor A. Urnyshev, Redmond, WA (US); Jianhua Liu, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 560 days.

(21) Appl. No.: 14/995,416

(22) Filed: Jan. 14, 2016

(65) Prior Publication Data
US 2017/0207970 A1    Jul. 20, 2017

(51) Int. Cl.
| G06F 16/21 | (2019.01) |
| G06Q 10/00 | (2012.01) |
| G06Q 10/06 | (2012.01) |
| G06Q 30/02 | (2012.01) |
| H04L 12/24 | (2006.01) |
| H04L 12/26 | (2006.01) |
| H04L 29/08 | (2006.01) |
| G06F 11/263 | (2006.01) |

(52) U.S. Cl.
CPC ........ *H04L 41/0866* (2013.01); *G06F 11/263* (2013.01); *G06F 16/21* (2019.01); *G06Q 10/00* (2013.01); *G06Q 10/06* (2013.01); *G06Q 10/0637* (2013.01); *G06Q 10/20* (2013.01); *G06Q 30/02* (2013.01); *H04L 43/50* (2013.01); *H04L 67/1097* (2013.01)

(58) Field of Classification Search
None
See application file for complete search history.

(56) References Cited

U.S. PATENT DOCUMENTS

| 8,489,929 | B2 | 7/2013 | Lam et al. |
| 8,627,321 | B2 | 1/2014 | Teichmann et al. |
| 8,707,264 | B2 | 4/2014 | Hossain et al. |
| 2008/0162491 | A1* | 7/2008 | Becker .............. G06F 17/30581 |
| 2012/0054754 | A1* | 3/2012 | Teichmann ........... H04L 41/082 |
| | | | 718/102 |
| 2014/0114913 | A1 | 4/2014 | Engelko et al. |

(Continued)

OTHER PUBLICATIONS

International Search Report and Written Opinion for International Patent Application No. PCT/US2017/013079, dated Mar. 2, 2017, date of filing: Jan. 12, 2017, 10 pages.

(Continued)

*Primary Examiner* — Azizul Choudhury
(74) *Attorney, Agent, or Firm* — Christopher J. Volkmann; Kelly, Holt & Christenson, PLLC

(57) ABSTRACT

A test tenant generation system comprises, in one example, a scheduling component configured to define a deployment schedule for deploying a plurality of test tenants, and a tenant deployment component configured to deploy the plurality of test tenants to a computing system based on the deployment schedule.

13 Claims, 8 Drawing Sheets

(56) References Cited

U.S. PATENT DOCUMENTS

2015/0172367 A1* 6/2015 Said ............... H04L 67/306
 709/204
2015/0370674 A1 12/2015 Lazar et al.
2016/0070555 A1* 3/2016 Xiong ............... G06Q 10/063
 717/171

OTHER PUBLICATIONS

"International Preliminary Report on Patentability Issued in PCT Application No. PCT/US2017/013079", dated Sep. 18, 2017, 7 Pages.
Second Written Opinion for International Patent Application No. PCT/US2017/013079, dated Jun. 23, 2017, date of filing; Jan. 12, 2017, 6 pages.
Yu, et al., "Testing as a Service over Cloud", In Proceedings of Fifth IEEE International Symposium on Service Oriented System Engineering, Jun. 4, 2010, pp. 181-188.
Vemulapati, et al., "SaaS Security Testing: Guidelines and Evaluation Framework", In Proceedings of 11th Annual International Software Testing Conference, Aug. 2011, pp. 1-8.
Patel, et al., "Ananta: Cloud Scale Load Balancing", In Proceedings of the ACM SIGCOMM conference on SIGCOMM, Aug. 12, 2013, pp. 207-218.
Herbold, et al., "The MIDAS Cloud Platform for Testing SOA Applications", In Proceedings of IEEE 8th International Conference on Software Testing, Verification and Validation, Apr. 13, 2015, 9 pages.
Stelle, Eduard., "SAP Cloud for Customer Tenant Landscapes: SDK deployment recommendations", Published on: Jul. 7, 2015 Available at: http://scn.sap.com/community/cloud-for-customer/blog/2015/07/07/sap-cloud-for-customer-tenant-landscapes-sdk-deployment-recommendations.
"Cisco VMDC Cloud Security 1.0—Design Guide", Retrieved on: Oct. 20, 2015 Available at: http://www.cisco.com/c/en/us/td/docs/solutions/Enterprise/Data_Center/VMDC/Cloud_Security/1-0/DG/ICSecurity/ICSecurity1.pdf.
Koponen, et al', "Network Virtualization in Multi-tenant Datacenters", In Technical Report Tr-2013-001E, Jan. 23, 2014, pp. 1-22.
Kempf, et al., "Zeppelin—A Third Generation Data Center Network Virtualization Technology based on SDN and MPLS", In Proceedings of IEEE 2nd International Conference on Cloud Networking, Nov. 11, 2013, 9 pages.
Kajeepeta, Sreedhar., "Multi-tenancy in the cloud: Why it matters", Published on: Apr. 12, 2010 Available at: http://www.computerworld.com/article/2517005/data-center/multi-tenancy-in-the-cloud—why-it-matters.html.

* cited by examiner

AUTOMATED CREATION OF TEST TENANTS FOR DATA CENTER TECHNICAL ISSUE DETECTION

BACKGROUND

Remote or distributed computing environments, such as cloud computing environments, deliver services over a network, such as the internet or other network, using appropriate protocols. For example, cloud computing providers host and deliver applications or other services over a wide area network and they can be accessed through a web browser or any other computing component. Software or components of the computing architecture as well as the corresponding data, can be stored on servers at a remote location.

As one example, a cloud computing environment includes a database system having one or more data centers. Each data center has one or more servers interacting with one or more databases in a controlled and ordered way. A data center can be a multi-tenant data center that hosts data or services for a plurality of different tenants. For instance, in an example multi-tenant system, each tenant utilizes a same or similar service instance that is configured for a given service or set of services.

By way of example, cloud computing services may provide access to an enterprise application (e.g., an enterprise resource planning (ERP) system, a customer resource management (CRM) system, a line-of-business (LOB) system, or other business data systems, etc.) that provides functionality for an enterprise to store data and commonly includes process functionality that facilities performing various processes or tasks on the data. Users log into or otherwise access the application in order to perform the processes and tasks. Some other examples include, for instance, document management computing systems that allow users to manage documents using a cloud service. Still other computing systems include electronic mail computing systems, computing systems that implement development environments, social network computing systems, among a wide variety of others.

The discussion above is merely provided for general background information and is not intended to be used as an aid in determining the scope of the claimed subject matter.

SUMMARY

A test tenant generation system comprises, in one example, a scheduling component configured to define a deployment schedule for deploying a plurality of test tenants, and a tenant deployment component configured to deploy the plurality of test tenants to a computing system based on the deployment schedule.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
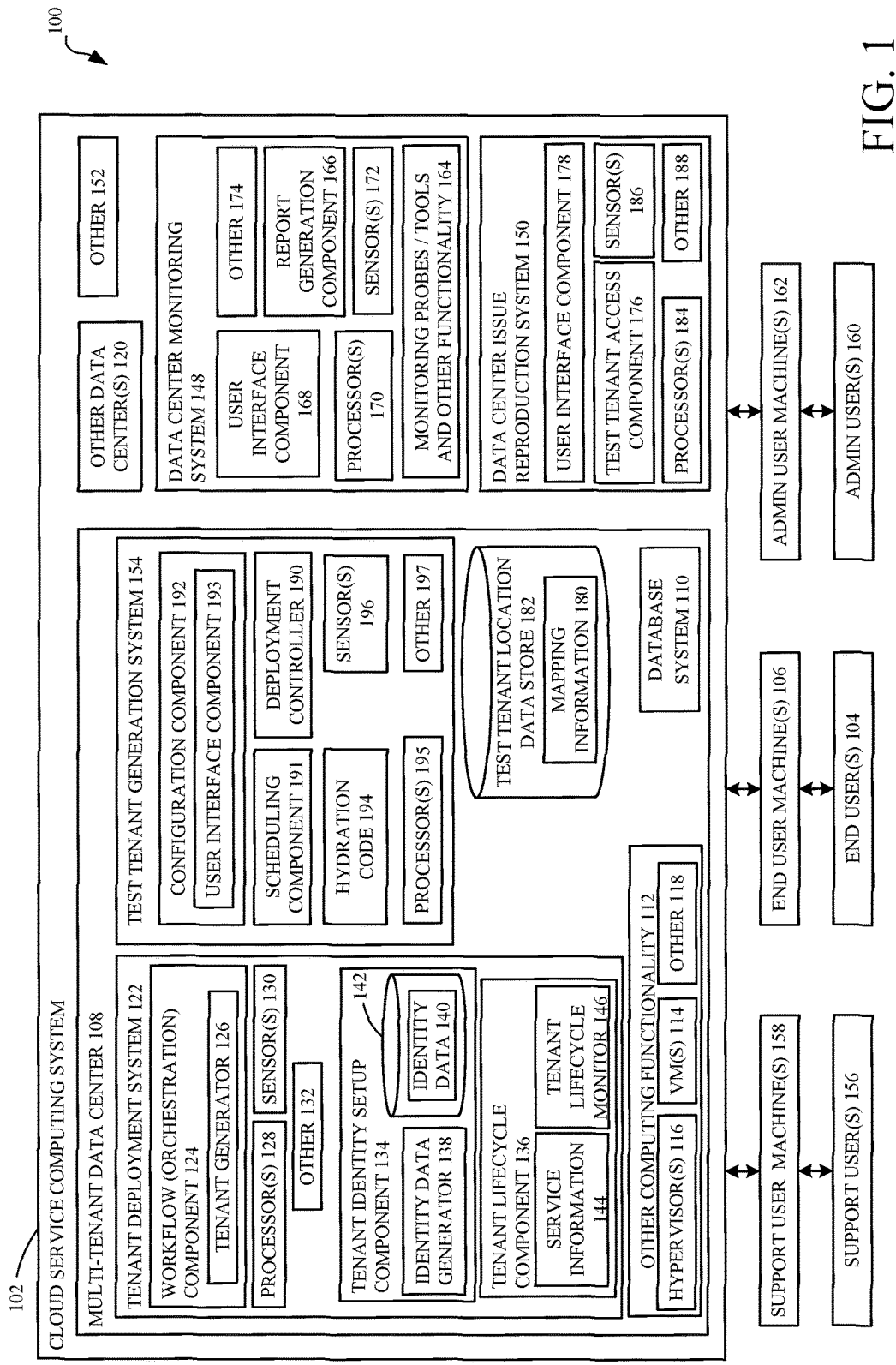
FIG. 1 is a block diagram of one example of a computing architecture.

FIG. 1 is a block diagram of one example of a computing architecture 100 in which embodiments described herein are applicable. Computing architecture 100 includes one or more computing systems that provide computing resources for end user services. In the illustrated example, computing architecture 100 comprises a remote or distributed server environment, such as but not limited to a cloud (referred to herein as cloud service computing system 102). Of course, other types and forms of computing environments are within the scope of the present disclosure.

Cloud computing environments are discussed in further detail below with respect to FIG. 7. Briefly, however, cloud resources may communicate with one another and can be grouped physically or virtually, in one or more networks. Architecture 100 can offer infrastructure, platforms, and/or software in a manner that does not require end-user knowledge of the physical location or configuration of the system that delivers the services. Architecture 100 includes a collection of integrated services (e.g., analytics, computing, database, mobile, network, storage, web, etc.) from underlying infrastructure resources, which can be of different types, that one or more users (e.g., end user(s) 104) can access using end user machine(s) 106. Cloud resources (e.g., data center resources, etc.) can be of different categories, including compute resources, network resources, and storage resources.

In FIG. 1, examples of user machines include, but are not limited to, desktop computers, laptop computers, servers, automobile systems, and tablet computers or other mobile devices, such as palm top computers, cell phones, smart phones, multimedia players, personal digital assistants, etc.

Resources can be pooled to serve multiple end users in a single or multi-tenant model. As used herein, a "tenant" comprises one or more users who share a common access with specific privileges to a service instance. Thus, a tenant may be seen as an owner or operator of a service deployment. For example, but not by limitation, each tenant in a multi-tenant scenario can correspond to a separate organization, or a separate group or organizational unit within a same organization. An example tenant includes one or more end users (e.g., end user(s) 104) that consume the underlying computing resource(s) in a service instance through end user machines 106 (e.g., a client device or other module). To illustrate, an end user 104 uses a machine 106 which communicates with the computing resource(s) in a multi-tenant data center 108 through a network to invoke and interact with the computing resource(s). In one example, this includes sending data to and receiving data from the computing service. For instance, a thin client device communicates with the service in data center 108 and provides end user 104 with access to the service functionality through a browser or other interface.

Multi-tenant data center 108 comprises a plurality of different servers or other components that provide a database system 110 for storing tenant data as well as configuration data for the services being provided by architecture 100. A plurality of different hardware computing systems can also be provided that implement other computing functionality 112, such as, for example, a plurality of different virtual machines (VMs) 114 corresponding to the tenant(s), and an underlying hypervisor or virtual machine monitor (VMM) 116 that creates and runs the virtual machines.

VMs 114 can include web servers that perform front end processing to accommodate service interactions by the various tenants, with the computing system. The virtual machines can also include back end servers that perform back end processing, such as processing against database system 110, or other types of back end processing. As but one example, it may be that such a computing system uses 40-200 different virtual machine servers which are deployed on a large number of hardware machines.

A hypervisor can comprise computer software, firmware, and/or hardware, and provide and manage machine-level services to each virtual machine. Other functionality 118 can be provided as well. Further, while one data center 108 is described in FIG. 1, architecture 100 can include one or more other data centers 120. Data centers 120 can be substantially similar to, or different from, data center 108.

Data center 108 includes a tenant deployment system 122 that includes a workflow (orchestration component) 124 having a tenant generator 126 configured to deploy a tenant system to a service instance provisioned in data center 108. For instance, system 122 can utilize initialization scripts for the service instance which configures various components of the service instance, such as networks, storage, and operating system functions. The tenant is then created in the database system 110, for example by storing the tenant data and service configuration data in one or more databases. In the illustrated example, each tenant's data is isolated from other tenant in database system 110.

When end users of the tenant access architecture 100, the tenant data is accessed from database system 110 and run on the service instance. Architecture 100 can provide different instances of the service, for each tenant, or the tenants can share services. In other words, a plurality of tenants can share a same service instance in a multi-tenant deployment. With this example multi-tenant architecture, a software application is designed to provide each of the plurality of tenants with a dedicated share of the service instance including its data, configuration, user management, tenant individual functionality, and/or non-functional properties.

Tenant deployment system 122 also includes one or more processors 128, one or more sensors 130, and can include other items 132 as well.

A service instance (or service unit) comprises logical grouping of target computing resources (e.g., one or more processing units, memory, storage, applications, virtual machines, networks, network bandwidth, etc.) that collectively hosts one or more applications or other services. In one example, a service instance is a set of infrastructure targets (e.g., hosts, databases, application services, etc.) that can be allocated and function together, in accordance with a service topology that defines a set of service characteristics, host the one or more applications or other services.

A service provides useful functions to its end users. In one example, a service models a process or application such as, but not limited to, an email application, an office productivity application, a financial application, a document sharing and/or collaboration application, a scheduling application, and/or an enterprise application or other business application (e.g., an enterprise resource planning (ERP) application, a customer resource management (CRM) application, a line-of-business (LOB) application).

In generating a new tenant deployment, system 122 can utilize a tenant identity setup component 134 and a tenant lifecycle component 136. In one example, tenant identity setup component 134 and tenant lifecycle component 136 comprise web service end points. Setup component 134 creates, using an identity data generator 138, identity data 140 that is stored in a data store 142. Identity data 140 includes, for each tenant deployed by system 122, tenant specific data that identifies attributes of the tenant. For example, identity data 140 can include an organization name, an organization identifier (ID), tenant administrator user name(s) and password(s) (or other authentication information), tenant end user name(s) and password(s) (or other authentication information), and primary keys for the tenant. As such, identity data 140 includes information required to log in to, or otherwise access, the corresponding tenant system once deployed to database system 110 by deployment system 122.

Tenant lifecycle component 136 includes service information 144 and a tenant lifecycle monitor 146. Service information 144 includes information about the service for which the tenant is being deployed. For example, service information 144 can include billing information, licensing information, a number of concurrent users allowed for the tenant deployment, and a service identifier (e.g., product SKUs identifying an application or set of applications for which the organization signed up for). As such, the service identifier identifies the type of service, from a plurality of available service types, for which the tenant is deployed. For instance, a first service type comprises an enterprise service package including a first set of application programs and a project service package includes a second set of application programs, different than the first set. Therefore, an organization can select from the different service types based on their needs. Deployment system 122 configures the tenant based on this information.

Service information 144 can further define a subscription period for the service for which the organization signed up. The subscription period defines the life span of the tenant, subject to renewal by the organization. In one example, the subscription period is one year. Therefore, the end users will have access to the tenant in database system 110 for one year, unless the organization opts to renew the subscription. Of course, shorter or longer subscription periods are possible. Tenant lifecycle monitor 146 is configured to monitor deployed tenants, for example to determine whether the tenants have expired due to their lifecycle terms.

Cloud service computing system 102 also includes a data center monitoring system 148, and a data center issue reproduction system 150. These systems are discussed in further detail below. System 102 can include other items 152 as well.

Figure 2:
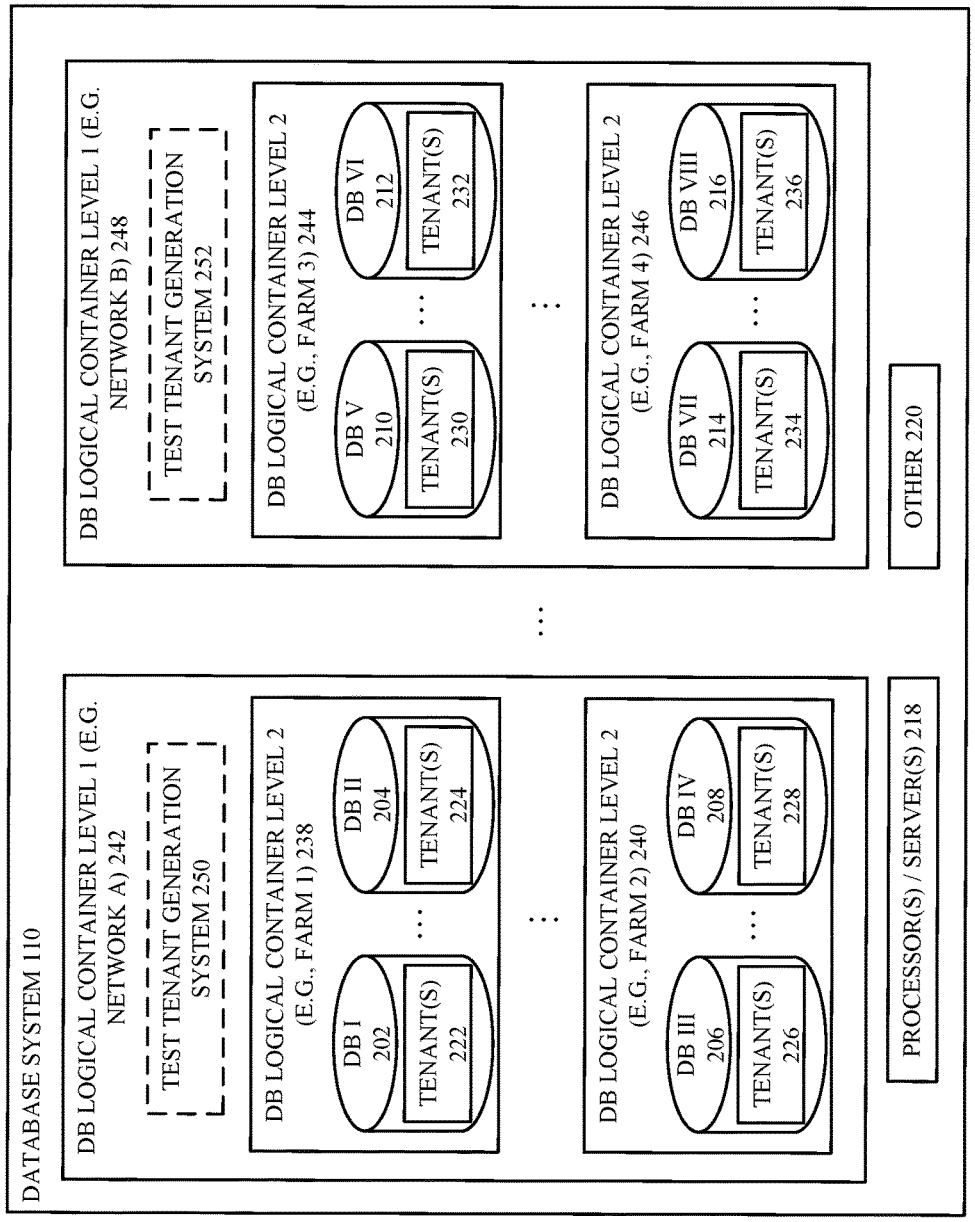
FIG. 2 is a block diagram of one example of a database system.

FIG. 2 illustrates one example of database system 110. Database system 110 comprises a plurality of databases 202, 204, 206, 208, 210, 212, 214, and 216. The number of databases illustrated in FIG. 2 is for sake of illustration only. Any number of databases can be used within database system 110. Database system 110 also includes one or more processors and/or servers 218, and can include other items 220 as well.

Each database can reside on one or more physical machines, such as one or more servers or other hardware components. Further, each individual machine can have a plurality of databases. As illustrated in FIG. 2, each database stores one or more tenants, which are represented by reference numerals 222, 224, 226, 228, 230, 232, 234, and 236.

As such, each database stores the data that is used for the particular tenant deployment(s). This can include tenant-specific data (e.g., data created by end users of the tenant during use of the tenant system) as well as configuration data that defines the service functionality of the tenant. In this way, the data stored in the databases for each tenant can vary depending on the service type (e.g., what applications are part of the tenant), or other factors.

As discussed in further detail below, one type of tenant comprises a deployment that is configured for use by end users (e.g., users of an organization that signs up for a service on system 102). This type of tenant will be referred to herein as an "end user tenant." Each end user tenant is isolated from other tenants in database system 110 and can be accessed by a specific set of end user(s) 104 using end user machines 106.

Another type of tenant comprises a test tenant which is configured for use by support users 156 (using support user machines 158), administrator user(s) 160 (using admin user machines 162), or other personnel that desire to test data center 108 or other components of computing system 102. Test tenants are discussed in further detail below. Briefly, however, a test tenant is deployed to have substantially similar configuration data and functionality as one or more of the end user tenants, such that the test tenant mimics or replicates those end user tenant(s). In one example, the test tenants are isolated from the end user tenants, and do not include or have access to the end user tenants and corresponding end user tenant data. As such, a test tenant can be used to test an end user deployment without requiring access to an actual end user tenant.

Referring again to FIG. 2, in one example the databases in database system 110 are logically grouped into a set of hierarchical containers. The manner in which the databases are logically grouped can depend on any of a variety of considerations. For example, the databases may be logically grouped based on physical considerations (e.g., their capacity, performance specifications, physical location in the data center, etc.), as well as any of a variety of other reasons. As such, each logical group can have different characteristics, such as different capacities, geographical locations, etc.

In the illustrated example of FIG. 2, three logical container levels are utilized. A top or upper level (e.g., "level 1") includes one or more subgroups (i.e., "level 2"), which each include one or more databases. More specifically, in FIG. 2, databases 202 and 204 are logically grouped in a container or group 238, and databases 206 and 208 are logically grouped in a container or group 240. Groups 238 and 240 are both part of upper level container 242. In the present example, but not by limitation, the sub-groups 238 and 240 are referred to as farms (i.e., "farm 1" and "farm 2"), and the upper level container 242 is referred to as a network (i.e., "network A").

Similarly, databases 210 and 212 are logically grouped in a container 244 (e.g., "farm 3") and databases 214 and 216 are logically grouped in a container 246 (i.e., "farm 4"). Containers 244 and 246 are part of a higher level container 248 (i.e., "network B"). Again, the logical database groupings shown in FIG. 2 are by way of example only.

Referring again to FIG. 1, in one example cloud service computing system 102 provides live site functionality that may be accessed by end users at any (or virtually any) time. Accordingly, system service updates are frequently rolled out to system 102 to update existing functionality, add new functionality, remove existing functionality, etc. In doing so, developers or other personnel may push code to the live site.

During operation, the end user tenants may experience technical issues due to hardware and/or software problems, for example. For instance, when an organization signs up for a service on system 102, the tenant provisioning process may experience technical issues leading to a partial or complete failure of the tenant to provision. Further, even if provisioned, some of the functionality of the tenant may fail to deploy properly. As such, there is a desire to monitor data center 108 and to address technical issues encountered by the end user tenants.

Further, a support experience for an end user can be quite troublesome and time consuming. While the support experience can take many forms, one form involves an end user calling a technical support person by telephone. The end user is connected with a support user, such as a support engineer, who often asks the user questions. It could be difficult for the support user to reproduce and diagnose the technical issue without requiring access to the end user tenant data. Further, the support user may not analyze the technical issue in a same deployment environment as the end user that is experiencing the issue. This can be exacerbated by the frequent updates, mentioned above.

Further yet, it can be difficult to monitor the health of a data center in a way that is closely coupled to specific portions of the data center. For example, referring again to FIG. 2, it may be that a technical issue exists on database 202, but database 202 cannot be directly targeted for monitoring. An example technical issue results in subsequent tenant provisioning request to database 202 failing (e.g., database 202 is switched to an inactive or offline state, or is otherwise configured in a way that prevents proper deployment of tenants to database 202).

Also, in another example, a new database, farm or network may be added to a database system, for example to expand capacity. One way of testing the new database component includes a support user manually deploying an end user tenant and testing its deployment. However, the tenant deployed by support user 156 may not be deployed to the new database component. As such, testing this tenant may not identify technical issues in the newly added database component.

Before discussing architecture 100 in further detail, it is noted that architecture 100 provides significant technical advantages. Some examples are discussed below. Briefly, however, architecture 100 facilitates technical issue detection for a data center, which can facilitate proactive fixes or other actions on the data center. Further, the technical issue detection can target the data center in a granular and scalable way. Further yet, the architecture deploys a test tenant using a same or substantially similar provision pipeline such that the test tenant mimics or replicates present functionally of an end user tenant, without requiring access to the end user tenant's data (which may include confidential or other privileged data that the end user tenant does not want to give access to).

Also, architecture 100 facilitates technical issue reproduction if a technical issue is encountered by an existing end user tenant. For example, if an end user tenant deployed to database 202 in FIG. 2 is experiencing a technical issue, support user 156 can identify a corresponding test tenant that also resides in the same database 202, or in the same logical database grouping (i.e., farm 238 or network 242).

As shown in FIG. 1, data center monitoring system 148 includes a set of monitoring probes or tools 164 that are configured to perform monitoring functionality on test tenants stored in database system 110. For example, using monitoring probes, monitoring system 148 can access a specific test tenant in database system 110 and analyze its deployment, and functionality within the deployment, to identify technical issues. For example, a monitoring probe can determine that a test tenant failed to provision on a particular database, farm, or network within database system 110. Using this information, a report generation component 166 can generate a report to a support user 156 that identifies the technical issues. Using this information, support user 156 can generate a fix that remedies the technical issue.

Monitoring system 148 also includes a user interface component 168 configured to generate user interface displays providing access to the monitoring functionality and report generation outputs. Monitoring system 148 is also shown as including one or more processors 170, one or more sensors 172, and can include other items 174 a well.

Data center issue reproduction system 150 includes a test tenant access component 176 configured to access a particular test tenant to reproduce a technical issue which can be used to develop a fix. In one example, a user interface component 178 generates user interface displays for support user 156 that allows support user 156 to access the particular test tenant in reproducing a technical issue being experienced by an end user tenant. Test access component 176 identifies the particular test tenant using mapping information 180 stored in a test tenant location data store 182. This is discussed in further detail below.

For example, support user 156 can select a test tenant that resides on the same database, same farm, or same network as the end user tenant experiencing the technical issue. The support user 156 can then login to or otherwise access that test tenant in an attempt to reproduce the technical issue scenario that the end user tenant is experiencing. By using the test tenant, support user 156 does not require access to the end user tenant, while still experiencing substantially similar functionality and tenant configuration as the end user tenant.

As shown in FIG. 1, system 150 also includes one or more processors 184, one or more sensors 186, and can include other items 188 as well.

Test tenant generation system 154 includes a deployment controller 190, a scheduling component 191, a configuration component 192 having a user interface component 193, and hydration code 194. System 154 is also illustrated as having one or more processors 195, one or more sensors 196, and can include other items 197 as well.

Deployment controller 190 is configured to control deployment system 122 in generating one or more test tenants. Deployment of the test tenants is performed in accordance with a generation schedule defined and maintained by scheduling component 191. For example, scheduling component 191 can define that a first set of test tenants are to be generated to a particular portion of database system 110 once every hour, once every day, once every week, etc. In deploying the test tenants in accordance with the schedule, hydration code 194 defines the attributes for the test tenant. For example, hydration code 194 comprises a script for hydrating test tenants, and can define the type of service for which the test tenants are to be generated, and can also specify the schedule to be used by scheduling component 191. Hydration code 194 thus integrates with a set of deployment end points within system 122, such as components 134 and component 136. As such, hydration code 194 facilitates the creation of test tenants in a manner that replicates or mimics the way in which the actual end user tenants are deployed. This operates to encourage reproduction of any and all technical issues that are or will be experienced by the end user tenants.

Also, hydration code 194 can define that a test tenant is to be generated when a new database component is put online (e.g., a new network, farm, or database is added to database system 110), as well as when a test tenant fails to deploy or expires. This is discussed in further detail below.

Using user interface component 193, configuration component 192 can generate configuration user interface displays that allows an admin user 160 to configure test tenant generation system 154. For example, admin user 160 can create and edit hydration code 194. In one example, hydration code 194 comprises a script file having a particular definition structure, such as, but not limited to, an INI file format. As such, the hydration code can be created and/or edited by admin user 160 using a text editor or other interface.

Further, admin user 160 can define how hydration code 194 and/or other components of test tenant generation system 154 interface with tenant identity setup component 134, tenant lifecycle component 136, and/or other components of deployment system 122. For example, admin user 160 can define the type of service for which the test tenant is to be deployed such that system 154 uses the same or similar pipeline components as when end user tenants are generated. In a manner similar to end user tenants, tenant identity setup component 134 generates identity data for the test tenant that is stored as identity data 140.

In one example, component 134 generates a simulated set of tenant identity data for the test tenant. This can include a domain name, an admin user account, an admin password for the admin user account, a non-admin user account, and a non-admin user password for the non-admin user account, to name a few. This information can be used by monitoring system 148 and data center issue reproduction system 150 to access and test the test tenant.

Further, hydration code 194 can instruct tenant life cycle component 136 to process the test tenant differently than an actual end user tenant. For instance, this can include preventing or changing the way in which the test tenant is processed through an invoice/billing system, since the test tenant is not deployed to an actual end user organization. Further, in one example, expiration of the test tenants is not monitored after deployment. As such, the test tenants are allowed to expire according to their normal life cycle (e.g., after a year for a one year service subscription).

Figure 3:
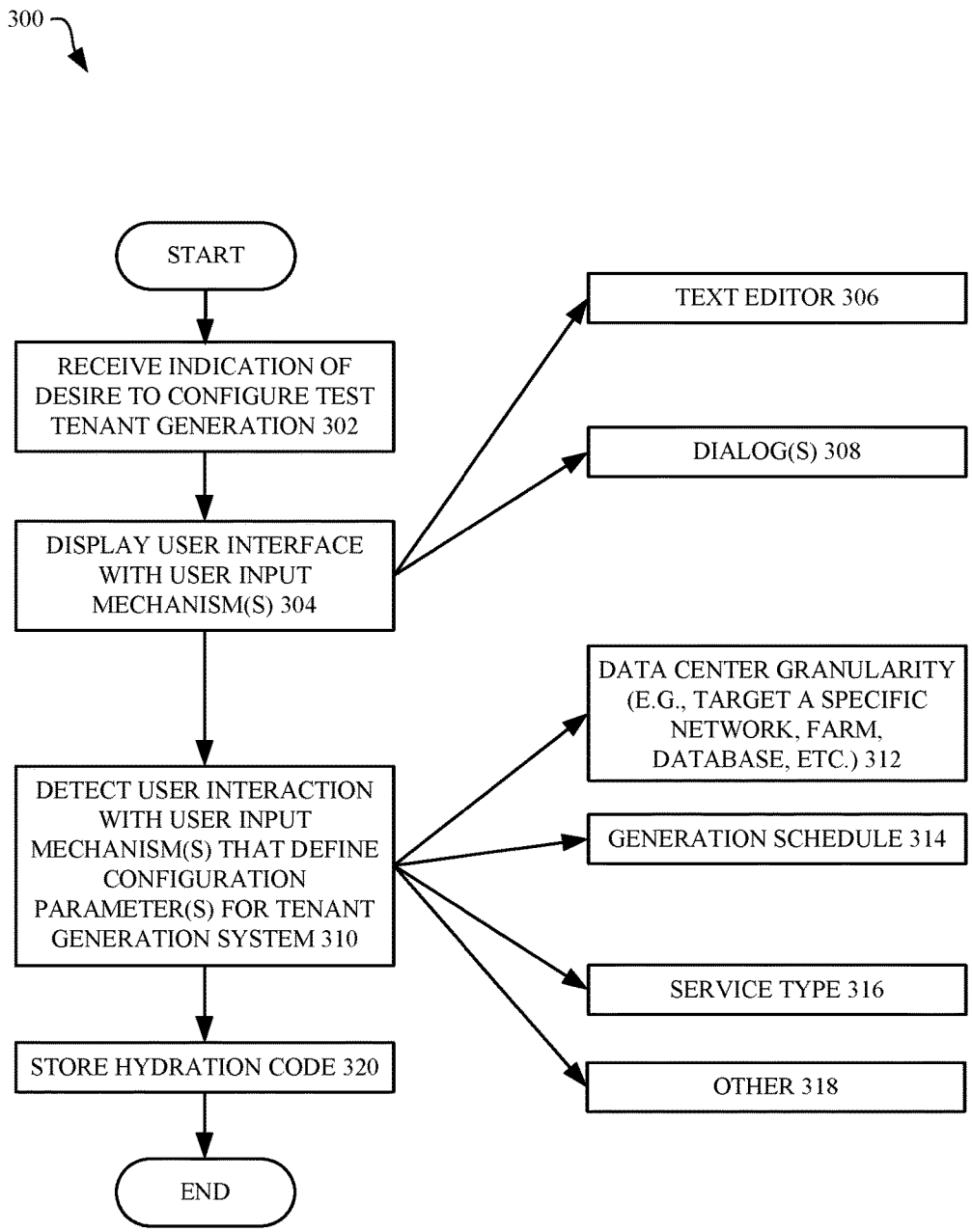
FIG. 3 is a flow diagram of one example of a method for configuring a test tenant generation system.

FIG. 3 is a flow diagram of one example of a method 300 for configuring a test tenant generation system. For sake of illustration, but not by limitation, method 300 will be described in the context of admin user 160 configuring system 154 through configuration component 192.

At block 302, an indication of a desire to configure test tenant generation system 154 is received. Then, at block 304, a configuration user interface (UI) is displayed with user input mechanisms. This can include, but is not limited to, a text editor (block 306) and/or a series of dialogs, such as a UI configuration wizard (block 308).

At block 310, a user interaction with the user input mechanisms is detected that define the configuration parameters for the test tenant generation. For example, this can include a data center granularity setting such that the test tenant generation targets a specific portion of database system 110. For instance, admin user 160 can specify that the test tenant generation is to target a specific database (e.g., database 202), or a specific logical grouping of databases (e.g., network 242, farm 238, etc.).

At block 314, admin user 160 can define the generation schedule. For example, test tenants can be scheduled for generation to database 202 once every hour, once every six hours, once every day, etc.

At block 316 the service type is defined for the test tenant. For example, admin user 160 can select an application or other product package identifier (e.g., a product SKU) that specifies the set of services for the test tenant. Other configuration parameters can be defined as well. This is represented at block 318.

At block 320, the hydration code is stored in test tenant generation system 154. The hydration code is subsequently executed to initiate and control the test tenant generation.

It is noted that method 300 can be repeated for each of a plurality of different test tenants. For example, if a plurality of different service types are available for end user tenants, a test tenant can be generated for each of the service types, and they can have the same or different generation schedules. To illustrate, in one example assume that a plurality of tenants reside in database 202, shown in FIG. 2, and that some of the tenants are of a first service type (e.g., a first set of software applications) and at least some of the tenants are a different service type (e.g., a second, different set of software applications). In this scenario, admin user 160 can define that a first set of test tenants are generated to target database 202 with the first service type and a second set of test tenants are generated to target database 202 with the second service type.

In another example, one or more of the first and second sets of test tenants can be set to target farm 238. In this manner, the test tenants, during deployment, will be provisioned to any database in farm 238. Thus, while the test tenants may not target the exact same database on which tenants 222 reside, they can still be used to monitor and reproduce technical issues for databases within that farm.

Also, it is noted that, in one example, a single instance of test tenant generation system 154 can reside in data center 108. This is shown in FIG. 1. As such, this test tenant generation system 154 can control generation of test tenants across all of the databases and groups of databases in database system 110. In another example, a plurality of test tenant generation systems 154 can be utilized, where each system can be independently configured with different sets of parameters. For example, but not by limitation, each network in database system 110 can have its own test tenant generation system. This is represented by blocks 250 and 252 in FIG. 2. Each of the test tenant generation systems 250 and 252 is responsible for controlling generation of test tenants within its own network. Use of a plurality of test tenant generation systems also provides redundancy in case of failure of one or more of the test tenant generation systems. Further, they can each be configured with their own levels of granularity and configurations.

Figure 4:
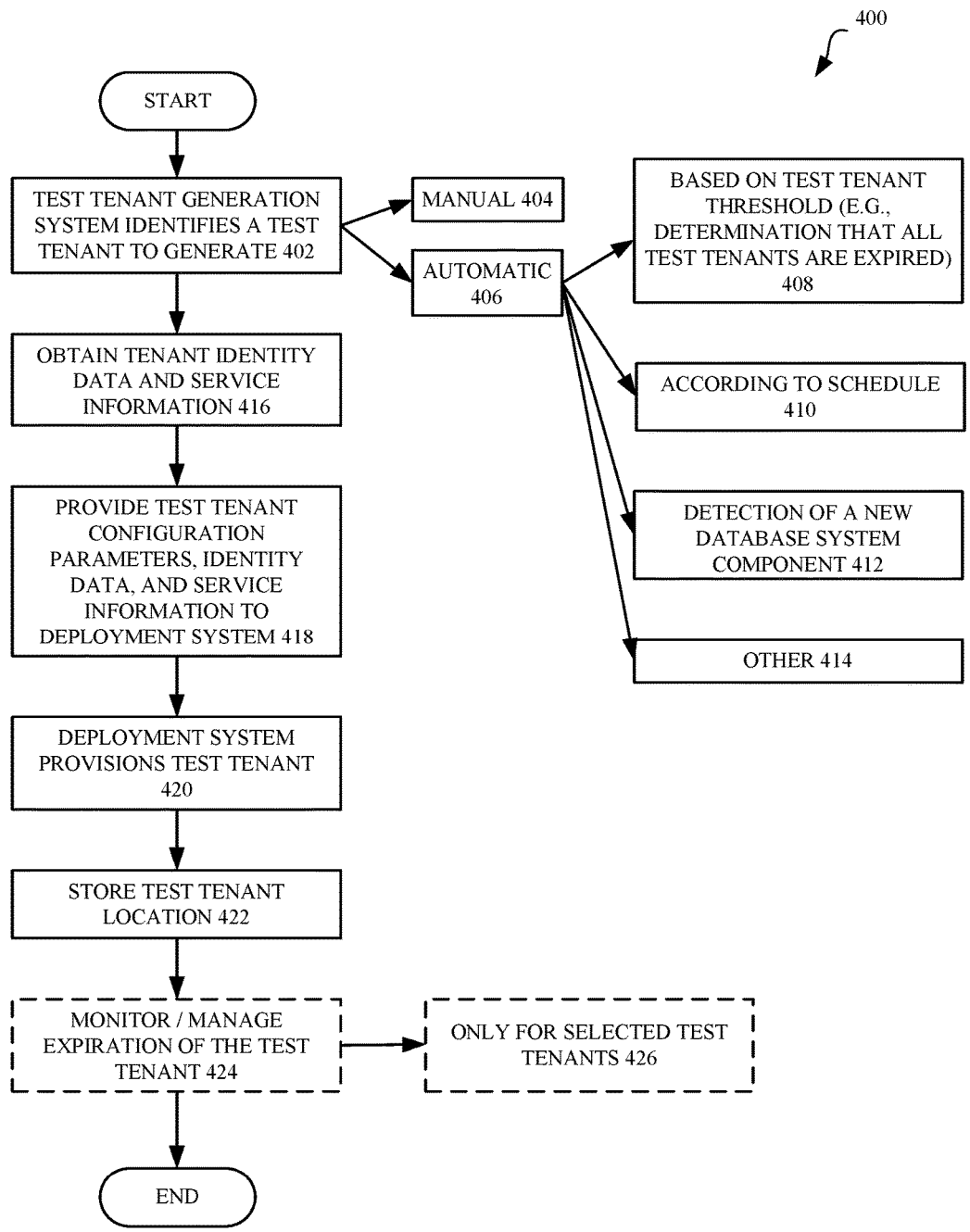
FIG. 4 is a flow diagram of one example of a method for generating test tenants.

FIG. 4 is a flow diagram of one example of a method 400 for generating test tenants. For sake of illustration, but not by limitation, method 400 will be described in the context of test tenant generation system 154 deploying test tenants to database system 110.

At block 402, test tenant generation system 154 identifies a test tenant to generate. For example, this can be done based on a manual input, for example by support user 156 or admin user 160. This is represented at block 404. In another example, identification of a test tenant to generate is performed automatically, for example by executing hydration code 194. This is represented at block 406.

In one example, test tenant generation system 154 determines that the number of test tenants deployed in database system 110 is below a threshold. This is represented at block 408. For instance, system 154 determines that all of the test tenants deployed to database 202 have expired, or the number of currently deployed, non-expired test tenants is below a threshold. In response, system 154 determines that one or more new test tenants should be deployed to database 202.

Alternatively, or in addition, system 154 can automatically identify a test tenant to generate according to the schedule defined by scheduling component 191. For example, generation system 154 can generate a test tenant for a given service type to a specific database once every hour.

In another example, a test tenant to generate is automatically identified in response to detection of a new database system component. This is represented at block 412. For example, system 154 can receive an input that indicates that a new database has been put online within farm 238. In response to this input, system 154 deploys a test tenant to the new database.

Of course, other ways of automatically identifying a test tenant to generate can be utilized as well. This is represented at block 414.

At block 416, tenant identity data and service information for the test tenant is obtained. In the illustrated example, using hydration code 194, test tenant generation system 154 interfaces with tenant identity setup component 134 and tenant life cycle component 136, to obtain tenant identity data and service information for the test tenant being deployed. In one example, identity data generator 138 generates a set of tenant data for the test tenant in the same manner identity data generator 138 creates tenant identity data for end user tenants. As such, test tenant generation system 154 interfaces with a same set of deployment end points, in a substantially similar manner, as when end user tenants are generated in database system 110.

Using the information obtained at block 416, the test tenant configuration parameters, identity data, and service information are provided to the deployment system at block 418. In one example, deployment controller 190 also identifies the specific portion of the database for which deployment system 122 will deploy the test tenant.

At block 420, deployment system 122 provisions the test tenant and, at block 422, test tenant location information is stored in data store 182. This test tenant location data illustratively comprises mapping information that maps the test tenant to its location in database system 110. For example, mapping information 180 comprises a table that maps a given test tenant to its particular database, farm or network within database system 110.

In one example, once deployed the test tenants are not monitored for expiration. In other words, each test tenant is allowed to expire under its own terms (e.g., based on the service subscription terms). This can alleviate processing bandwidth and data storage requirements that would otherwise be required to track the life cycle of each test tenant.

Alternatively, at block 424, the life cycle of each tenant can be monitored and the expiration of each test tenant can be actively managed. For example, if a given service has a subscription length of one year, and test tenants are to be generated once every hour, there may be 8,760 test tenants deployed to the database system. This, in one example of block 424, system 154 is configured to force test tenants to expire after a particular period of time, or when a certain number of test tenants is reached.

Further, block 424 can be performed for only selected test tenants. This is represented at block 426. For example, selecting which test tenants for which to manage life cycles can depend on the deployment schedule for the test tenants (e.g., how many test tenants will be created). In one example, for test tenants that are provisioned less frequently, system 154 can be configured to check how many test tenants are not expired. Thus, if only two test tenants are provisioned to a particular database, block 426 can perform life cycle management to see if both of the test tenants are still active and, if not, provision one or more new test tenants.

In one example, deployment system 122 maintains a provisioning list of tenants to be deployed to database system 110. The provisioning list can include both end user tenants and test tenants, or test tenants only. Further, each tenant in the provisioning list can include an associated provisioning priority that is based on any of a variety of factors. Some factors include, but are not limited to, the target location in database system 110 for the associated test tenant, a service type for the associated test tenant, a last time a test tenant was provisioned to the target location in database system 110, a number of times test tenant(s) have been provisioned to the target location in database system 110, or any other desired factor(s). In one example, deployment system 122 is configured to prioritize the tenants to provision by sort the provisioning list to identify a highest priority test tenant, or set of tenants.

Figure 5:
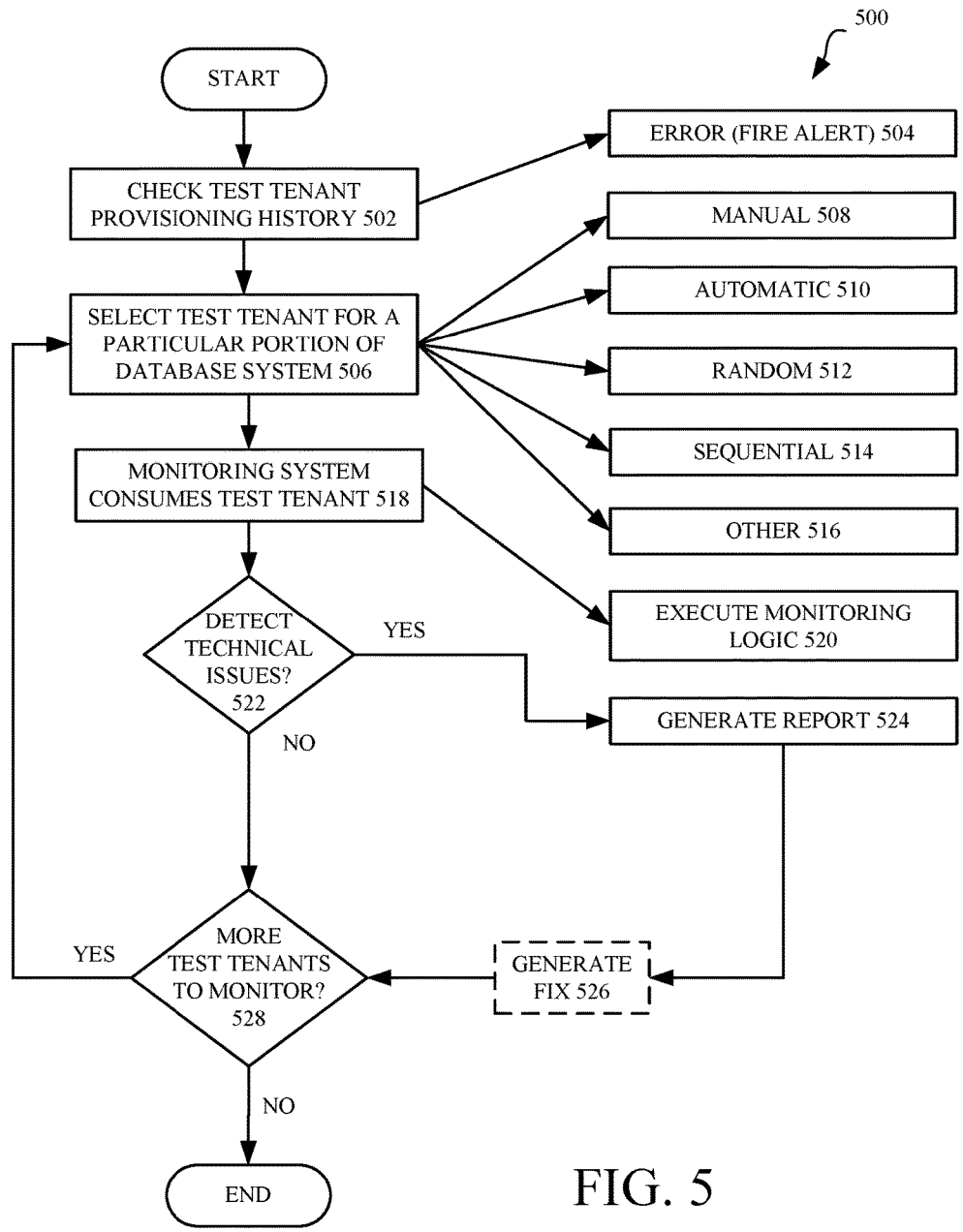
FIG. 5 is a flow diagram of one example of a method for monitoring test tenants for technical issue detection.

FIG. 5 is a flow diagram of one example of a method 500 for monitoring test tenants for technical issue detection. For sake of illustration, but not by limitation, method 500 will be described in the context of data center monitoring system 148 shown in FIG. 1.

At block 502, system 148 checks the test tenant provisioning history to determine how many test tenants have been provisioned within a given time period and whether there is a backlog of test tenants to be provisioned. The check at block 502 can be performed periodically, for example every hour, every day, etc. If there is a backlog (e.g., over a threshold number) of test tenants to be provisioned, this could indicate a problem on the deployment or provisioning pipeline (e.g., deployment system 122) that creates the test tenants. If so, an error can be reported at block 504, such as by generating an error report using report generation component 166.

At block 506, system 148 selects a test tenant for which to apply monitoring probes 164. This can be done manually (e.g., in response to a user input), which is represented by block 508 and/or automatically (represented by block 510). Further, the selection can be test tenant specific (e.g., selecting a particular test tenant) or it can be based on a particular portion of database system 110. For example, block 506 can select a particular database, upon which the method traverses through that database to select and analyze each of its test tenants. The selection at block 506 can be random (block 512) or sequential (block 514). Of course, a test tenant can be selected in other ways as well. This is represented by block 514.

In one example, method 500 performs a health check on test tenants in database system 110 by identifying healthy tenants that will be consumed by the monitoring probes. In one example, test tenants are selected based on tenant state information which can be stored in data store 182, or other data store in architecture 100. The tenant state information can include a set of stored properties that indicate whether the tenant has failed or otherwise not completed provisioning, and whether the tenant has corrupted data.

Once a test tenant is selected, data center monitoring system 148 applies the monitoring probes to test the test tenant at block 516. In one example, data center monitoring system 148 accesses test tenant credentials, such as a username and password required to access the test tenant deployment. Monitoring logic is executed at block 518. The monitoring logic determines whether technical issues are present in the test tenant.

A technical issue can pertain to any of a variety of aspects of the test tenant. For example, the technical issue can pertain to how the test tenant was provisioned, such as whether the test tenant can be accessed with the credentials. In another example, the technical issue can pertain to service functionality within the test tenant. These, of course, are examples only.

If, at block 520, a technical issue is detected, the method proceeds to block 522 in which a report is generated by report generation component 166. The report can be provided to a support user 156 or other component of architecture 100. In response to the detected technical issue, a fix can be generated at block 524.

At block 526, it is determined whether there are any more test tenants to monitor. If so, the method returns to block 506 and blocks 516-526 are repeated for one or more additional test tenants.

Figure 6:
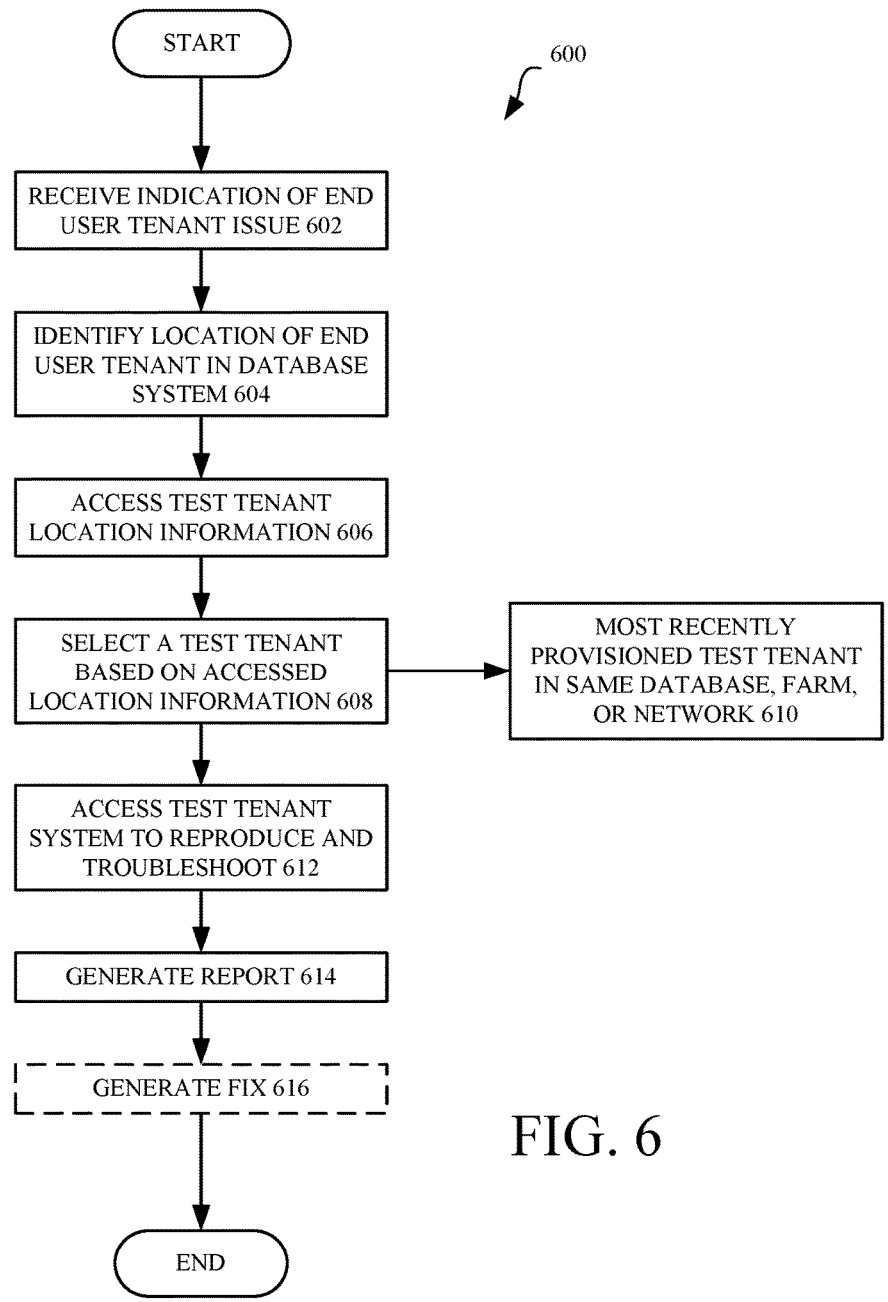
FIG. 6 is a flow diagram of one example of a method for reproducing a technical issue from an end user tenant.

FIG. 6 is a flow diagram of one example of a method 600 for reproducing a technical issue from an end user tenant. For sake of illustration, but not by limitation, method 600 will be described in the context of system 150. At block 602, an indication of an end user tenant issue is received. For example, a support user 156 identifies a particular end user tenant that has a technical issue. Examples include, but are not limited to, a service/support call from a user of the end user tenant, or by identifying an end user tenant from the report generated in the method of FIG. 5. These, of course, are by way of example only.

Once the end user tenant issue is identified, a location of the end user tenant is identified in the database system. This is represented by block 604. Identification of the location can be done in any of a variety of ways. In one example, a tenant location store is accessed to identify a particular database to which the end user tenant system is deployed.

At block 606, test tenant location information is accessed that identifies locations of a set of available test tenants. For example, the mapping information 180 in data store 182 is accessed.

At block 608, a test tenant is selected based on the location information accessed at block 606. For example, a most recent set of one or more provisioned test tenant in the same database, farm or network as the end user tenant having the technical issue is selected. This is represented at block 610. In one example, this can be done by displaying a list of test tenants, with corresponding location information, to support user 156 to allow support user 156 to select a desired test tenant. In another example, this process can be at least partially automated, for example by providing an interface which the user can input the location of the end user tenant and a suggested test tenant is output.

At block 612, the test tenant system can be accessed by support user 156 to reproduce and troubleshoot the technical issue. In one example, the support user 156 is provided with the appropriate credentials for accessing the test tenant, thereby allowing the support user 156 to login to the test tenant and reproduce the technical issue. The support user 156 can thus identify the technical issue and can generate a report at block 614. One example of a technical issue that can be identified by support user 156 is a provisioning problem upon which support user 156 is unable to login and browse the test tenant.

At block 616, a fix for the technical issue can be generated. For example, support user 156 can provide a description of the technical issue to a developer who develops and deploys a fix to the appropriate components to the appropriate components of cloud service computing system 102.

It can thus be seen that the present description provides significant technical advantages. As mentioned above, in illustrated examples, the present description provides an architecture that facilitates proactive technical issue detection by deploying test tenants to a computing system (e.g., a data center). The test tenants can target a specific portion of the data center (e.g., a specific database, or logical grouping of databases) which allows the computing system to be verified all the way to the database level where the end user tenant's data is actually stored. Further, the test tenant mimics or replicates the end user tenants such that it has substantially similar functionality as the end user tenant, without requiring access to the end user tenant's data (which may include confidential or other privilege data that the end user tenant does not want to give access to). Thus, the monitoring that occurs on an end user tenant system is virtually identical to the actual end user tenant system. Moreover, the test tenants can be generated in accordance with a schedule (e.g., once every hour, once every day, etc.) such that the test tenant being monitored is the same, or substantially similar to, the current service deployment that will be used for subsequent end user tenant deployments.

Also, architecture 100 facilitates technical issue reproduction, for example if a technical issue is encountered by an existing end user tenant. To illustrate, if an end user tenant in a data center is experiencing a technical issue, a support user can identify a corresponding test tenant that also resides in a same database, or in a same logical database grouping. This facilitates enhanced technical issue detection and reproduction, for example by obtaining a more precise determination as to the cause of a technical issue (e.g., whether a technical issue is caused by a malfunction of a specific database component, by the service deployment system, or for some other reason). This, in turn, facilitates improved system maintenance and development.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, user interface components generating a number of user interface displays have been discussed. They can take a wide variety of different forms and can have a wide variety of different user actuatable input mechanisms disposed thereon, for example to sense physical activities of the user. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

Also, the figures show a number of blocks with functionality ascribed to each block. It will be noted that fewer blocks can be used so the functionality is performed by fewer components. Also, more blocks can be used with the functionality distributed among more components. Further, it is noted that the described systems of architecture 100 can be local to one another or can be located remotely from each other. For example, any one of systems 122, 148, 150 and 154 can be located remotely (such as on a different server in a different geographic region) than one or more of the other systems.

It will be noted that the above discussion has described a variety of different systems and/or components. They can also be implemented as logic. It will be appreciated that such systems, components and/or logic can be comprised of hardware items (such as processors and associated memory, or other processing components, some of which are described above) that perform the functions associated with those systems, components and/or logic. In addition, the systems, components and/or logic can be comprised of software that is loaded into a memory and is subsequently executed by a processor or server, or other computing component, as described above. The systems, components and/or logic can also be comprised of different combinations of hardware, software, firmware, etc., some examples of which are described above. These are only some examples of different structures that can be used to form the systems, components and/or logic described above. Other structures can be used as well.

It should also be noted that the discussion herein includes one or more data stores. The data stores can be any of a variety of different types of data stores. Further, the data in the data stores can be consolidated into a same data store, and can be stored in multiple additional data stores as well. Also, the data stores can be local to the environments, agents, modules, and/or components that access them, or they can be remote therefrom and accessible by those environments, agents, modules and/or components. Similarly, some can be local while others remote.

Figure 7:
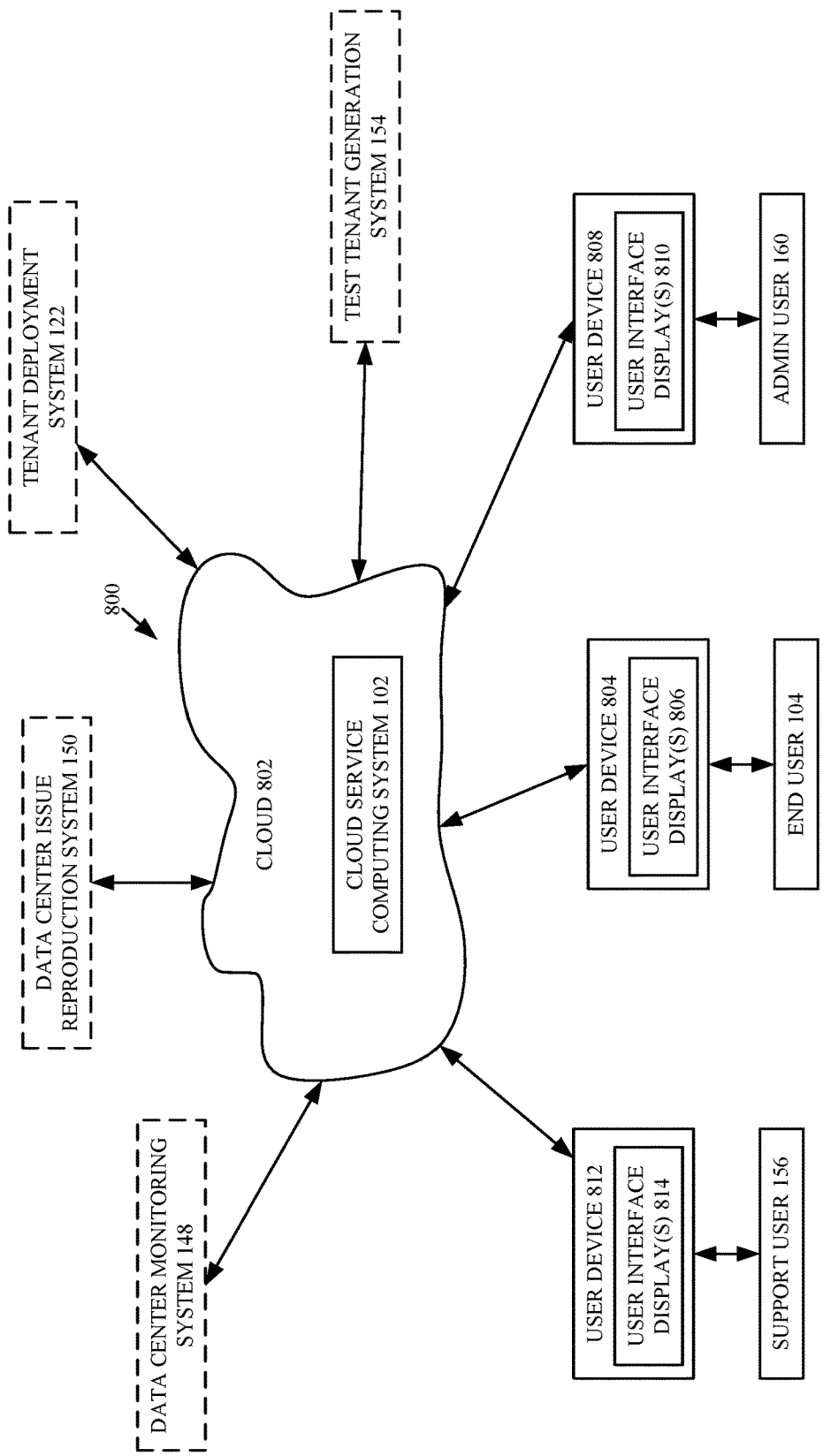
FIG. 7 is a block diagram of the architecture shown in FIG. 1, deployed in an example cloud computing architecture.

FIG. 7 is a block diagram of architecture 100, shown in FIG. 1, except that its elements are disposed in example cloud computing architecture 800. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 7, some items are similar to those shown in FIG. 1 and they are similarly numbered. FIG. 7 specifically shows that cloud service computing system 102 is located in cloud 802 (which can be public, private, or a combination where portions are public while others are private). Therefore, end user 104 uses a user device 804 (and user interface displays 806) to access those systems through cloud 802. Similarly, admin user 160 uses a user device 808 (and user interface displays 810) to access the systems through cloud 802, and support user 156 uses a user device 812 (and user interface displays 814) to access those systems through cloud 802.

FIG. 7 also depicts another example of a cloud architecture. FIG. 7 shows that it is also contemplated that some elements of system 102 can be disposed in cloud 802 while others are not. By way of example, tenant deployment system 122 can be disposed outside of cloud 802, and accessed through cloud 802. In another example, test tenant generation system 154 can be disposed outside of cloud 802, and accessed through cloud 802. In another example, data center monitoring system 148 can be disposed outside of cloud 802, and accessed through cloud 802. In another example, data center issue reproduction system 150 can be disposed outside of cloud 802, and accessed through cloud 802. Regardless of where they are located, they can be accessed directly by devices 804, 808, and/or 812, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
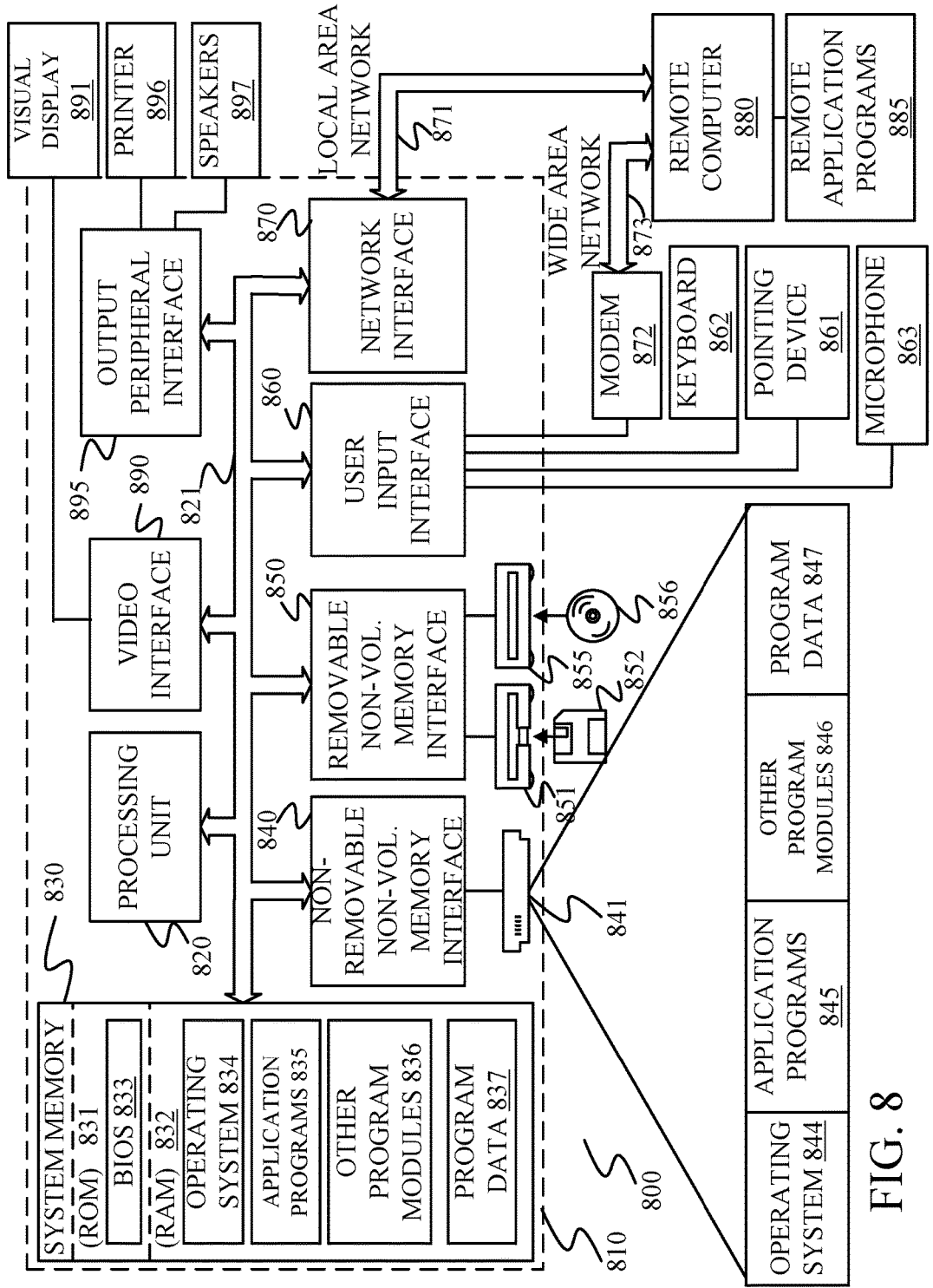
FIG. 8 is a diagrammatic view of one example of a computing environment.

FIG. 8 is a diagrammatic view of one example of a computing environment in which architecture 100, or parts of it, (for example) can be deployed. With reference to FIG. 8, an exemplary system for implementing some examples includes a general-purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 8 illustrates operating system 934, application programs 935, other program modules 936, and program data 937.

The computer 910 may also include other removable/non-removable volatile/nonvolatile computer storage media. By way of example only, FIG. 8 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 910. In FIG. 8, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections to one or more remote computers, such as a remote computer 980. The remote computer 980 may be a personal computer, a hand-held device, a server, a router, a network PC, a peer device or other common network node, and typically includes many or all of the elements described above relative to the computer 910. The logical connections depicted in FIG. 8 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 8 illustrates remote application programs 985 as residing on remote computer 980. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a test tenant generation system comprising a scheduling component configured to define a deployment schedule for deploying a plurality of test tenants, and a tenant deployment component configured to deploy the plurality of test tenants to a computing system based on the deployment schedule.

Example 2 is the test tenant generation system of any or all previous examples, wherein the computing system comprises a cloud service computing system.

Example 3 is the test tenant generation system of any or all previous examples, wherein the computing system comprises a multi-tenant data center.

Example 4 is the test tenant generation system of any or all previous examples, wherein the tenant deployment component is configured to target a specific portion of the computing system for deployment of the plurality of test tenants.

Example 5 is the test tenant generation system of any or all previous examples, wherein the specific portion of the computing system comprises a specific database or logical grouping of databases.

Example 6 is the test tenant generation system of any or all previous examples, wherein the tenant deployment component comprises a deployment controller configured to control a tenant deployment system, the tenant deployment system being configured to deploy an end user tenant to the computing system based on configuration data that defines service functionality for the end user tenant.

Example 7 is the test tenant generation system of any or all previous examples, wherein the end user tenant includes end user-specific data, and wherein the test tenant comprises a substantial reproduction of the end user tenant that mimics the service functionality without the end user-specific data.

Example 8 is the test tenant generation system of any or all previous examples, wherein the scheduling component is configured to define a first deployment schedule for deploying a first set of test tenants, having a first service type, to the computing system, and define a second deployment schedule for deploying a second set of test tenants, having a second service type, to the computing system.

Example 9 is the test tenant generation system of any or all previous examples, wherein the first and second sets of test tenants are deployed to a same portion of a data center.

Example 10 is the test tenant generation system of any or all previous examples, wherein the first and second sets of tenants are deployed to different portions of a data center.

Example 11 is the test tenant generation system of any or all previous examples, and further comprising a monitoring system configured to monitor a selected one of the test tenants to identify a technical issue in the selected test tenant.

Example 12 is the test tenant generation system of any or all previous examples, and further comprising an issue reproduction system configured to receive an indication of an end user tenant having a technical issue, receive an indication of a portion of the computing system in which the indicated end user tenant is deployed, and identify a test tenant that is deployed within the indicated portion of the computing system, and a user interface component configured to generate a user interface display to access the identified test tenant and reproduce the technical issue in the identified test tenant.

Example 13 is the test tenant generation system of any or all previous examples, and further comprising a test tenant location data store configured to store mapping information that maps the plurality of test tenants to corresponding locations in the computing system, wherein the issue reproduction system identifies the test tenant based on the mapping information.

Example 14 is a computing system comprising a deployment system configured to deploy an end user tenant based on configuration data that defines service functionality for the end user tenant, and a test tenant generation system configured to control the deployment system to deploy a test tenant having substantially similar service functionality as the end user tenant.

Example 15 is the computing system of any or all previous examples, wherein the end user tenant includes end user-specific data, and wherein the test tenant comprises a substantial reproduction of the end user tenant that mimics the service functionality without the end user-specific data.

Example 16 is the computing system of any or all previous examples, and further comprising a tenant identity setup component comprising a tenant identity generator configured to generate a first set of tenant identity data for the end user tenant and a second set of tenant identify data for the test tenant.

Example 17 is the computing system of any or all previous examples wherein the test tenant generation system is configured to identify a particular portion of a data center, determine that a number of test tenants deployed in the particular portion of the data center is below a threshold, and deploy the test tenant based on the determination.

Example 18 is the computing system of any or all previous examples, and further comprising a user interface component configured to generate a test tenant generation user interface display with a user input mechanism that receives a user input defining a configuration parameter used by the test tenant generation system in deploying the test tenant, wherein the configuration parameter defines at least one of a deployment schedule for deploying the test tenant, a portion of a data center to which to deploy the test tenant, or a service type for the test tenant.

Example 19 a computer system comprising a deployment system configured to deploy an end user tenant to a data center based on configuration data that defines service functionality for the end user tenant, and a test tenant generation system configured to generate a test tenant by targeting a same portion of the data center in which the end user tenant is deployed such that the end user tenant and the test tenant simultaneously reside within the same portion of the data center.

Example 20 is the computing system of any or all previous examples, wherein the same portion of the data center comprises a particular database or logical grouping of databases.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What is claimed is:

1. A multi-tenant computing system comprising:
    at least one processor;
    memory storing instructions executable by the at least one processor, wherein the instructions, when executed, configure the multi-tenant computing system to provide:
        a scheduling component configured to define a deployment schedule for deploying a plurality of test tenants to the multi-tenant computing system;
        a tenant deployment component configured to deploy the plurality of test tenants based on the deployment schedule, wherein each test tenant is deployed to a service instance in the multi-tenant computing system by:
            identifying configuration data that defines service functionality for an end user tenant in the multi-tenant computing system; and
            provisioning the service instance with computing resources in the multi-tenant computing system that are configured based on the configuration data; and
        a test tenant access component configured to:
            generate an interface configured to access a particular one of the test tenants and generate a technical issue, corresponding to a particular one of the end user tenants, in the particular test tenant.

2. The multi-tenant computing system of claim 1, wherein the multi-tenant computing system comprises a cloud service computing system.

3. The multi-tenant computing system of claim 1, wherein the tenant deployment component is configured to target a specific portion of the multi-tenant computing system for deployment of the plurality of test tenants.

4. The multi-tenant computing system of claim 3, wherein the specific portion of the multi-tenant computing system comprises a specific database or logical grouping of databases.

5. The multi-tenant computing system of claim 1, wherein the end user tenant includes end user-specific data, and wherein the test tenant comprises a substantial reproduction of the end user tenant that mimics the service functionality without the end user-specific data.

6. The multi-tenant computing system of claim 1, wherein the scheduling component is configured to:
    define a first deployment schedule for deploying a first set of test tenants, having a first service type, to the multi-tenant computing system; and
    define a second deployment schedule for deploying a second set of test tenants, having a second service type, to the multi-tenant computing system.

7. The multi-tenant computing system of claim 6, wherein the first and second sets of test tenants are deployed to a same portion of a data center.

8. The multi-tenant computing system of claim 6, wherein the first and second sets of tenants are deployed to different portions of a data center.

9. The multi-tenant computing system of claim 1, wherein the instructions configure the multi-tenant computing system to provide:
    a monitoring system configured to monitor the particular test tenant to identify the technical issue in the particular test tenant.

10. The multi-tenant computing system of claim 1, wherein the instructions configure the multi-tenant computing system to provide:
    an issue reproduction system configured to:
        receive an indication of the particular end user tenant having the technical issue;
        receive an indication of a portion of the multi-tenant computing system in which the particular end user tenant is deployed; and determine that the particular test tenant is deployed within the indicated portion of the multi-tenant computing system; and a user interface component configured to generate a user interface display to access the particular test tenant and reproduce the technical issue in the particular test tenant.

11. The multi-tenant computing system of claim 10, and further comprising:

a test tenant location data store configured to store mapping information that maps the plurality of test tenants to corresponding locations in the multi-tenant computing system, wherein the issue reproduction system identifies the particular test tenant based on the mapping information.

12. A computing system comprising:

at least one processor;

memory storing instructions executable by the at least one processor, wherein the instructions, when executed, configure the computing system to provide:

a deployment component configured to deploy an end user tenant to a multi-tenant data center based on configuration data that defines service functionality for the end user tenant;

a test tenant generation component configured to:
identify a first location in the multi-tenant data center to which the end user tenant is deployed;

generate a test tenant by:
identifying a second location in the multi-tenant data center that corresponds to the first location;

provisioning a service instance with computing resources in the second location in the multi-tenant data center; and deploying the test tenant to the service instance such that the end user tenant and the test tenant simultaneously reside within a same portion of the multi-tenant data center; and store, in a test tenant location data store, mapping information that maps the test tenant to the second location; and an issue reproduction system configured to:
detect a technical issue with respect to the end user tenant; and based on the mapping information, select the test tenant; and generate an interface configured to access the selected test tenant and reproduce the technical issue in the selected test tenant.

13. The computing system of claim 12, wherein the same portion of the multi-tenant data center comprises a particular database or logical grouping of databases.

* * * * *